US 12,511,880 B2

(12) United States Patent
Majewski

(10) Patent No.: US 12,511,880 B2
(45) Date of Patent: Dec. 30, 2025

(54) DEVICE AND METHOD FOR UPDATING PERCEPTUAL MODEL

(71) Applicant: TOYOTA JIDOSHA KABUSHIKI KAISHA, Toyota (JP)

(72) Inventor: Lukasz Kamil Majewski, Chiba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 265 days.

(21) Appl. No.: 18/522,832

(22) Filed: Nov. 29, 2023

(65) Prior Publication Data

US 2024/0273876 A1    Aug. 15, 2024

(30) Foreign Application Priority Data

Feb. 15, 2023   (JP) .................................. 2023-021562

(51) Int. Cl.
| | | |
|---|---|---|
| *G06V 10/774* | (2022.01) | |
| *G06V 10/764* | (2022.01) | |
| *G06V 20/56* | (2022.01) | |
| *G06V 20/70* | (2022.01) | |

(52) U.S. Cl.
CPC .......... *G06V 10/774* (2022.01); *G06V 10/764* (2022.01); *G06V 20/70* (2022.01); *G06V 20/56* (2022.01)

(58) Field of Classification Search
CPC .... G06V 10/764; G06V 10/774; G06V 20/56; G06V 20/70
See application file for complete search history.

(56) References Cited

U.S. PATENT DOCUMENTS

| | | |
|---|---|---|
| 11,048,979 B1 | 6/2021 | Zhdanov et al. |
| 11,082,369 B1 | 8/2021 | Liu et al. |
| 2020/0202171 A1 | 6/2020 | Hughes et al. |
| 2020/0302233 A1 | 9/2020 | Iwasaki |
| 2021/0042580 A1* | 2/2021 | Chen ...................... G06N 3/084 |
| 2021/0319340 A1* | 10/2021 | Shabtay ................... G06N 5/04 |
| 2021/0374543 A1* | 12/2021 | Matsumoto ......... G06F 18/2148 |
| 2022/0301287 A1* | 9/2022 | Annangi .............. G06V 10/764 |
| 2022/0366280 A1* | 11/2022 | Rowe ................ G06F 18/24147 |
| 2024/0143976 A1* | 5/2024 | Lee ........................ G06N 20/20 |

FOREIGN PATENT DOCUMENTS

| | | |
|---|---|---|
| JP | 2020-522055 A | 7/2020 |
| WO | 2019/116423 A1 | 6/2019 |

\* cited by examiner

*Primary Examiner* — Jennifer Mehmood
*Assistant Examiner* — Jose M Torres
(74) *Attorney, Agent, or Firm* — Dinsmore & Shohl LLP

(57) ABSTRACT

A perceptual model update device inputs each of pieces of target data and modified data obtained by making a predetermined modification to the piece of target data into a perceptual model to predict a label corresponding to the piece of target data and to calculate an uncertainty score and an inconsistency score; classifies the pieces of target data into first, second, and third data, based on the uncertainty score and the inconsistency score; gives an input label inputted via an input device to the first data as a label of the first data; gives a label to the second data by a predetermined labeling model; and updates the perceptual model by training the perceptual model with the first and second data given the label and the third data.

6 Claims, 6 Drawing Sheets

DEVICE AND METHOD FOR UPDATING PERCEPTUAL MODEL

CROSS-REFERENCE TO RELATED APPLICATIONS

This application claims priority to Japanese Patent Application No. 2023-021562 filed on Feb. 15, 2023, the entire contents of which are herein incorporated by reference.

FIELD

The present disclosure relates to a device and a method for updating a perceptual model, which is trained so as to predict a label corresponding to inputted data, by training the perceptual model.

BACKGROUND

Being trained with appropriate training data, a perceptual model will be able to predict a label of input data appropriately. Training data is made by giving correct labels to (annotating) target data extracted from a large amount of original data. Manual annotation by labelers requires much time and work.

Time and work for making training data can be reduced by including as much data effective in training a perceptual model as possible in target data extracted from original data for annotation to make the training data. Data whose label a perceptual model cannot predict confidently is an example of data effective in training a perceptual model. U.S. patent Ser. No. 11/048,979 describes an active learning service in which target data for labeling is extracted from a large amount of original data according to criteria, such as randomness, uncertainty, and representativeness, and a perceptual model is updated with the extracted target data. Uncertainty is a scale indicating how uncertain a label predicted by the perceptual model is.

SUMMARY

If target data is extracted from original data at random or on the basis of representativeness, the target data will include a predetermined percentage of data ineffective in training a perceptual model, and thus time and work for making training data cannot be reduced.

If target data is extracted from original data on the basis of uncertainty, data effective in training a perceptual model can be included in the target data as much as possible, and thus time and work for making training data can be reduced. However, target data extracted from original data on the basis of uncertainty includes many outliers of the entire original data. Being trained with such target data, a perceptual model may overlearn outliers and may not be able to predict a label corresponding to input data appropriately.

It is an object of the present disclosure to provide a perceptual model update device that updates a perceptual model appropriately.

The following is a summary of the present disclosure.

(1) A perceptual model update device including a processor configured to:

input each of pieces of target data and modified data obtained by making a predetermined modification to the piece of target data into a perceptual model to predict a label corresponding to the piece of target data and to calculate an uncertainty score corresponding to the piece of target data and an inconsistency score indicating the magnitude of the difference between the label predicted for the piece of target data and the label predicted for the modified data, the perceptual model being trained so as to predict a label corresponding to inputted data and to output an uncertainty score, the uncertainty score indicating how uncertain the prediction is;

classify, out of the pieces of target data, the piece of target data whose uncertainty score is higher than a predetermined uncertainty threshold and whose inconsistency score is higher than a predetermined inconsistency threshold as first data, classify the piece of target data whose uncertainty score is lower than the uncertainty threshold and whose inconsistency score is higher than the inconsistency threshold as second data, and classify the piece of target data whose uncertainty score is lower than the uncertainty threshold and whose inconsistency score is lower than the inconsistency threshold as third data;

give an input label inputted via an input device to the first data as a label of the first data, and give the label to the second data by a predetermined labeling model configured to give the label to inputted data; and update the perceptual model by training the perceptual model with the first data given the label, the second data given the label, and the third data.

(2) The perceptual model update device according to (1), wherein the processor is further configured to extract the piece of target data from pieces of data with a predetermined probability for each of classes into which the pieces of data are classified based on situations in which the respective pieces of data were obtained.

(3) The perceptual model update device according to (1) or (2), wherein each of the pieces of target data is image data including pixels, and the perceptual model is trained so as to predict the label for each of the pixels included in the image data.

(4) The perceptual model update device according to (3), wherein to predict the label, the processor uses data obtained by reversing the positions of the pixels in the image data horizontally as the modified data.

(5) A method for updating a perceptual model executed by a perceptual model update device that updates a perceptual model trained so as to predict a label corresponding to inputted data and to output an uncertainty score indicating how uncertain the prediction is, the method including:

inputting each of pieces of target data and modified data obtained by making a predetermined modification to the piece of target data into the perceptual model to predict the label corresponding to the piece of target data and to calculate the uncertainty score corresponding to the piece of target data and an inconsistency score indicating the magnitude of the difference between the label predicted for the piece of target data and the label predicted for the modified data;

classifying, out of the pieces of target data, the piece of target data whose uncertainty score is higher than a predetermined uncertainty threshold and whose inconsistency score is higher than a predetermined inconsistency threshold as first data, classifying the piece of target data whose uncertainty score is lower than the uncertainty threshold and whose inconsistency score is higher than the inconsistency threshold as second data, and classifying the piece of target data whose uncertainty score is lower than the uncertainty threshold and whose inconsistency score is lower than the inconsistency threshold as third data;

giving an input label inputted via an input device to the first data as a label of the first data, and giving the label to the second data by a predetermined labeling model configured to give the label to inputted data; and updating the perceptual model by training the perceptual model with the first data given the label manually, the second data given the label by the labeling model, and the third data.

(6) A non-transitory computer-readable medium storing a computer program for updating a perceptual model, the computer program causing a computer to execute a process including:

inputting each of pieces of target data and modified data obtained by making a predetermined modification to the piece of target data into a perceptual model to predict a label corresponding to the piece of target data and to calculate an uncertainty score corresponding to the piece of target data and an inconsistency score indicating the magnitude of the difference between the label predicted for the piece of target data and the label predicted for the modified data, the perceptual model being trained so as to predict a label corresponding to inputted data and to output an uncertainty score, the uncertainty score indicating how uncertain the prediction is;

classifying, out of the pieces of target data, the piece of target data whose uncertainty score is higher than a predetermined uncertainty threshold and whose inconsistency score is higher than a predetermined inconsistency threshold as first data, classifying the piece of target data whose uncertainty score is lower than the uncertainty threshold and whose inconsistency score is higher than the inconsistency threshold as second data, and classifying the piece of target data whose uncertainty score is lower than the uncertainty threshold and whose inconsistency score is lower than the inconsistency threshold as third data;

giving an input label inputted via an input device to the first data as a label of the first data, and giving the label to the second data by a predetermined labeling model configured to give the label to inputted data; and updating the perceptual model by training the perceptual model with the first data given the label manually, the second data given the label by the labeling model, and the third data.

The perceptual model update device according to the present disclosure can update a perceptual model appropriately.

DESCRIPTION OF EMBODIMENTS

A perceptual model update device will now be described in detail with reference to the attached drawings. The perceptual model update device inputs each of pieces of target data and modified data obtained by making a predetermined modification to the piece of target data into a perceptual model to predict a label corresponding to the piece of target data and to calculate an uncertainty score and an inconsistency score. The perceptual model has been trained so as to predict a label corresponding to inputted data and to output an uncertainty score of the label. The label indicates, for example, the type of an object represented in the data. The inconsistency score indicates the magnitude of the difference between the label predicted for the piece of target data and the label predicted for the modified data corresponding to the piece of target data. The perceptual model is configured, for example, by a neural network that executes semantic segmentation to give, for each pixel included in an inputted image, a label depending on an object represented in the pixel, such as Segnet or U-Net.

Out of the pieces of target data, the perceptual model update device classifies a piece of target data whose uncertainty score is higher than a predetermined uncertainty threshold and whose inconsistency score is higher than a predetermined inconsistency threshold as first data. In addition, out of the pieces of target data, the perceptual model update device classifies a piece of target data whose uncertainty score is lower than the uncertainty threshold and whose inconsistency score is higher than the inconsistency threshold as second data. Further, out of the pieces of target data, the perceptual model update device classifies a piece of target data whose uncertainty score is lower than the uncertainty threshold and whose inconsistency score is lower than the inconsistency threshold as third data.

The perceptual model update device gives an input label inputted via an input device to the first data as a label of the first data, and gives a label to the second data by a predetermined labeling model configured to give a label to inputted data. The perceptual model update device updates the perceptual model by training the perceptual model with the first data given the label, the second data given the label, and the third data.

Figure 1:
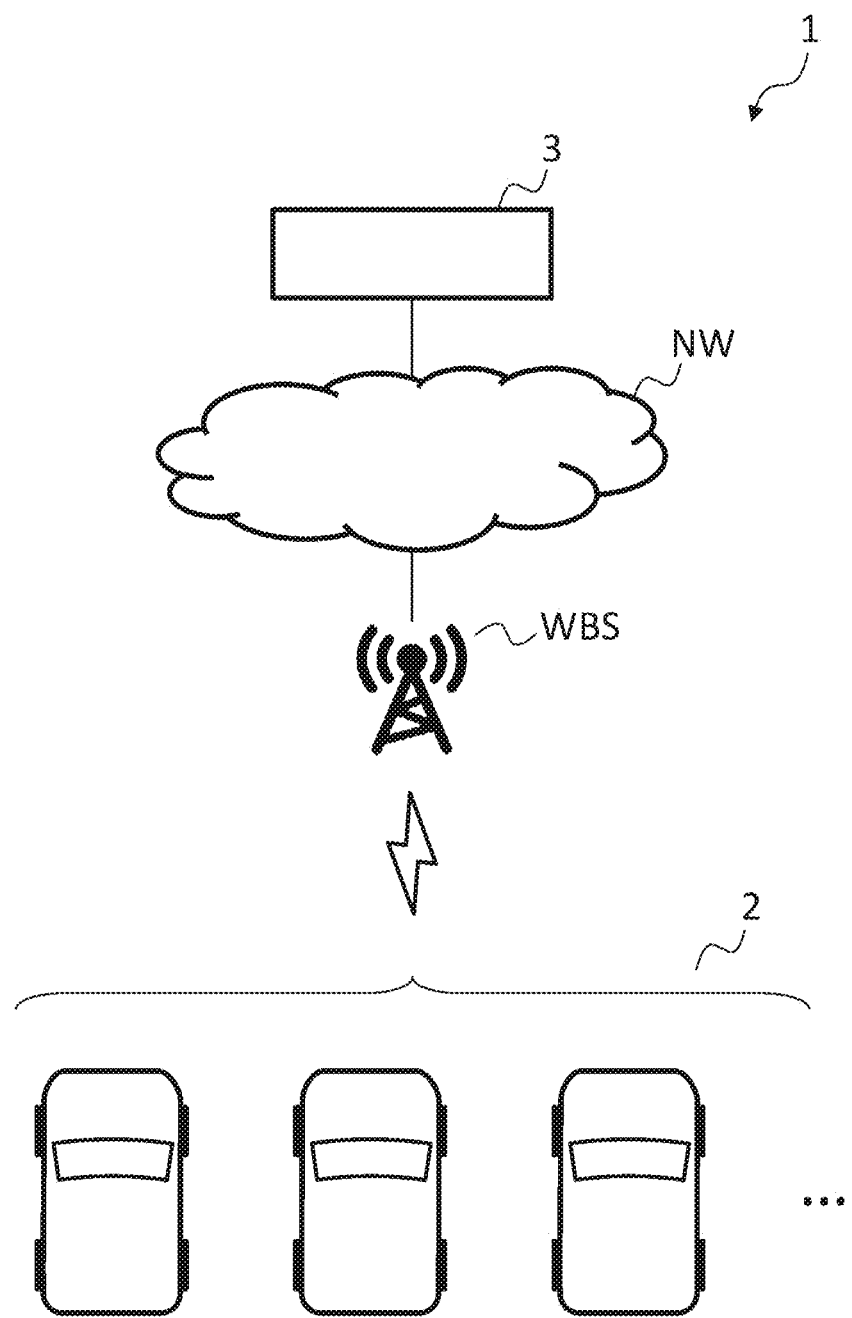
FIG. 1 schematically illustrates the configuration of a perceptual model update system.

FIG. 1 schematically illustrates the configuration of a perceptual model update system. In the present embodiment, the perceptual model update system 1 includes multiple vehicles 2 and a perceptual model update device 3, which updates a perceptual model with data collected by the vehicles 2. Each of the vehicles 2 accesses a wireless base station WBS, which is connected, for example, via a gateway (not illustrated) to a communication network NW connected with the perceptual model update device 3, thereby communicably connecting to the perceptual model update device 3 via the wireless base station WBS and the communication network NW. In the following, one of the vehicles 2 will be referred to as a "vehicle 2." In the perceptual model update system 1, the communication network NW may be connected with multiple wireless base stations WBS.

Figure 2:
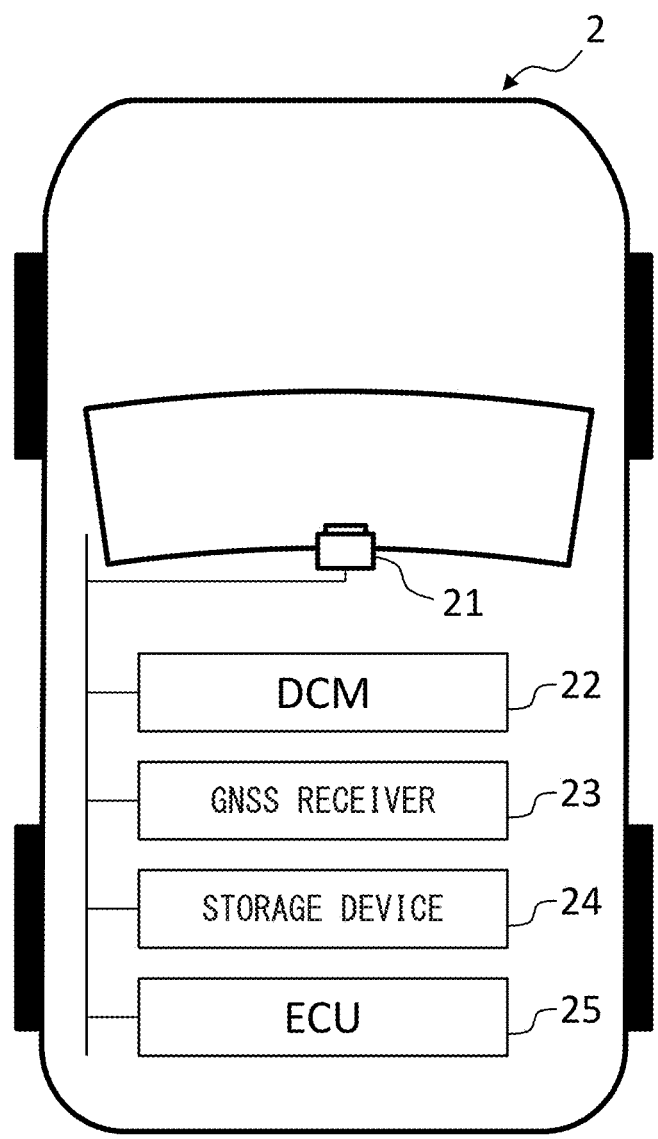
FIG. 2 schematically illustrates the configuration of a vehicle.

FIG. 2 schematically illustrates the configuration of the vehicle 2. The vehicle 2 includes a camera 21 for generating images of the surroundings, a data communication module (DCM) 22, a global navigation satellite system (GNSS) receiver 23, a storage device 24, and an electronic control unit (ECU) 25. The camera 21, the data communication module 22, the GNSS receiver 23, and the storage device 24 are communicably connected to the ECU 25 via an in-vehicle network conforming to a standard such as a controller area network.

The camera 21 is an example of an update data generator that generates update data used for updating a perceptual model by the perceptual model update device 3. The camera 21 generates a vicinity image representing the surroundings of the vehicle 2 as image data included in the update data. The camera 21 includes a two-dimensional detector constructed from an array of optoelectronic transducers, such as CCD or C-MOS, having sensitivity to visible light and a focusing optical system that forms an image of a target region on the two-dimensional detector. The camera 21 is disposed, for example, in a front upper area in the vehicle interior and oriented forward. The camera 21 takes pictures of the surroundings of the vehicle 2 through front and rear windshields every predetermined capturing period (e.g., 1/30 to 1/10 seconds), and outputs vicinity images representing the surroundings.

As an update data generator, the vehicle 2 may include a light detection and ranging (LiDAR) sensor that generates a depth map whose pixels each have a value depending on the distance to an object in the vicinity of the vehicle 2 represented in the pixel. The LiDAR sensor includes a laser that generates infrared laser light and a light receiver that two-dimensionally scans laser light reflected by an object and received through an optical window. The light receiver measures the time until laser light radiated and reflected by an object is received, thereby generating a depth map whose pixels each have a value depending on the distance to an object represented in the pixel. The LiDAR sensor is disposed, for example, in a front upper area in the vehicle interior and oriented forward, and outputs a depth map indicating the distance to an object ahead of the vehicle 2 every predetermined capturing period (e.g., 1/30 to 1/10 seconds). The depth map is an example of the image data.

The data communication module 22, which is an example of a communication device, is a device to execute a wireless communication process conforming to a predetermined wireless communication standard, such as "4G (4th Generation)" or "5G (5th Generation)", and accesses, for example, the wireless base station WBS to communicably connect to the perceptual model update device 3 via the wireless base station WBS and the communication network NW. The data communication module 22 includes data received from the ECU 25 in an uplink radio signal, and transmits the radio signal to the wireless base station WBS, thereby transmitting data to the perceptual model update device 3. The data communication module 22 may be mounted as part of the ECU 25.

The GNSS receiver 23 is an example of an environmental data generator that generates environmental data indicating environment at the time of generation of data by the update data generator, and receives GNSS signals from GNSS satellites with a GNSS antenna (not illustrated) at predetermined intervals, and determines the position of the vehicle 2, based on the received GNSS signals. The GNSS receiver 23 generates a positioning signal indicating the result of determination of the position of the vehicle 2 based on the GNSS signals as environmental data, and outputs the data to the ECU 25 via the in-vehicle network at predetermined intervals.

As an environmental data generator, the vehicle 2 may include a temperature sensor that outputs temperature data indicating temperature around the vehicle 2, an illuminance sensor that outputs illuminance data indicating illuminance around the vehicle 2, and a rainfall sensor that outputs rainfall data indicating rainfall around the vehicle 2.

The storage device 24, which is an example of vehicle storage, includes, for example, a hard disk drive or a nonvolatile semiconductor memory, and stores vicinity images outputted by the camera 21. The storage device 24 may store map data including information on features such as lane lines in association with their positions.

The ECU 25 includes a communication interface, a memory, and a processor, and obtains a vicinity image from the camera 21 via the communication interface, and stores the image in the storage device 24. Further, the ECU 25 obtains, from the storage device 24, map information around a position indicated by a positioning signal obtained from the GNSS receiver 23 at the time corresponding to the time of generation of a vicinity image. The ECU 25 compares the shape of lane lines included in the map information with road shape templates prestored in the memory to identify the type of road shape (e.g., a sharp curve or a divergent point) at the time of generation of the vicinity image, and stores the type of road shape in the storage device 24 in association with the vicinity image, as environmental data indicating environment at the time of generation of the vicinity image. The ECU 25 may store temperature, illuminance, or rainfall at the time of generation of the vicinity image in the storage device 24 in association with the vicinity image as environmental data. Further, the ECU 25 transmits the vicinity image and the associated environmental data stored in the storage device 24 to the perceptual model update device 3 via the communication interface and the data communication module 22.

The ECU 25 may obtain, from the storage device 24, map information around the position of the vehicle indicated by a positioning signal outputted by the GNSS receiver 23, and transmits a control signal to a travel mechanism of the vehicle 2 so that the vehicle 2 travels in a lane demarcated by lane lines included in the map information, thereby executing automated driving of the vehicle 2. The travel mechanism includes, for example, an engine or a motor for powering the vehicle 2, brakes for decelerating the vehicle 2, and a steering mechanism for steering the vehicle 2.

The ECU 25 may further control travel of the vehicle 2 so that the distance to an object in the vicinity detected from a vicinity image outputted by the camera 21 is greater than a predetermined distance. The ECU 25 can detect an object in the vicinity by inputting a vicinity image into a classifier that has been trained to detect an object from an image. The classifier may be a perceptual model to be updated by the perceptual model update device of the present disclosure.

Figure 3:
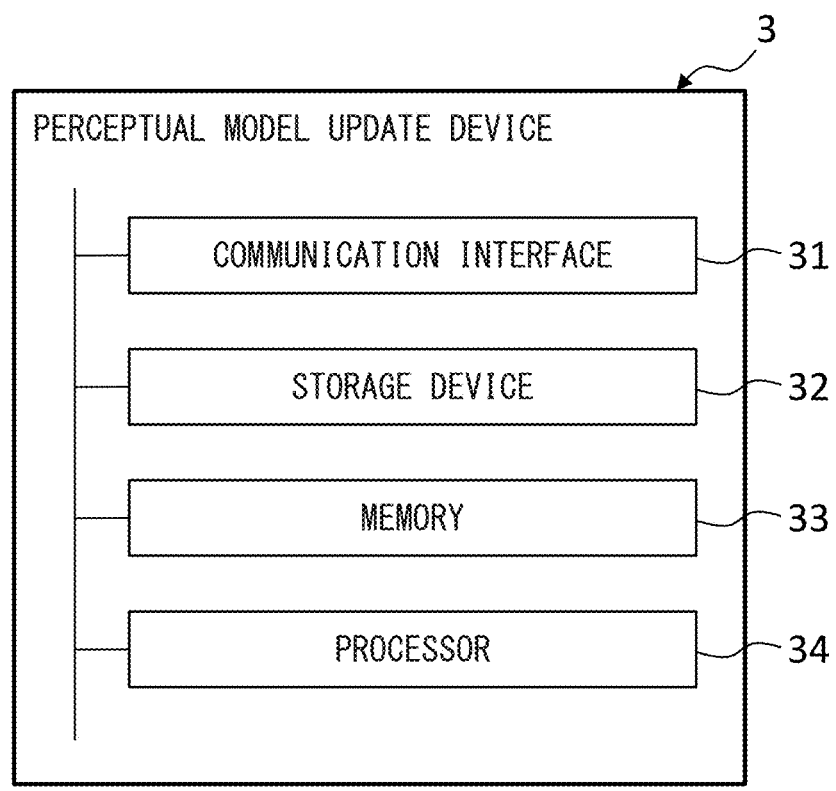
FIG. 3 illustrates the hardware configuration of a perceptual model update device.

FIG. 3 illustrates the hardware configuration of the perceptual model update device 3. The perceptual model update device 3 includes a communication interface 31, a storage device 32, a memory 33, and a processor 34.

The communication interface 31, which is an example of a communication unit, includes an interface circuit for connecting the perceptual model update device 3 to the communication network NW, and is configured to be communicable with another device via the communication network NW. More specifically, the communication interface 31 passes, to the processor 34, data received from a device via the communication network NW, and transmits data received from the processor 34 to a device via the communication network NW.

The storage device 32, which is an example of a storage unit, includes storage, such as a hard disk drive or a nonvolatile semiconductor memory device, and stores vicinity images and environmental data transmitted from each of the vehicles 2. Vicinity images are an example of pieces of data stored in the storage device 32.

The memory 33, which is another example of a storage unit, includes volatile and nonvolatile semiconductor memories, and stores various types of data used for processing by the processor 34, e.g., parameter groups for specifying a perceptual model and a labeling model, target data extracted from pieces of data stored in the storage device 32, and an uncertainty threshold and an inconsistency threshold used for classifying pieces of target data whose labels are predicted by the perceptual model. The memory 33 also stores various application programs, e.g., a computer program for updating a perceptual model, which is for causing the perceptual model update device 3 to execute a method for updating a perceptual model.

The processor 34 includes one or more central processing units (CPUs) and a peripheral circuit thereof, and may further include another operating circuit, such as a logic-arithmetic unit or an arithmetic unit.

Figure 4:
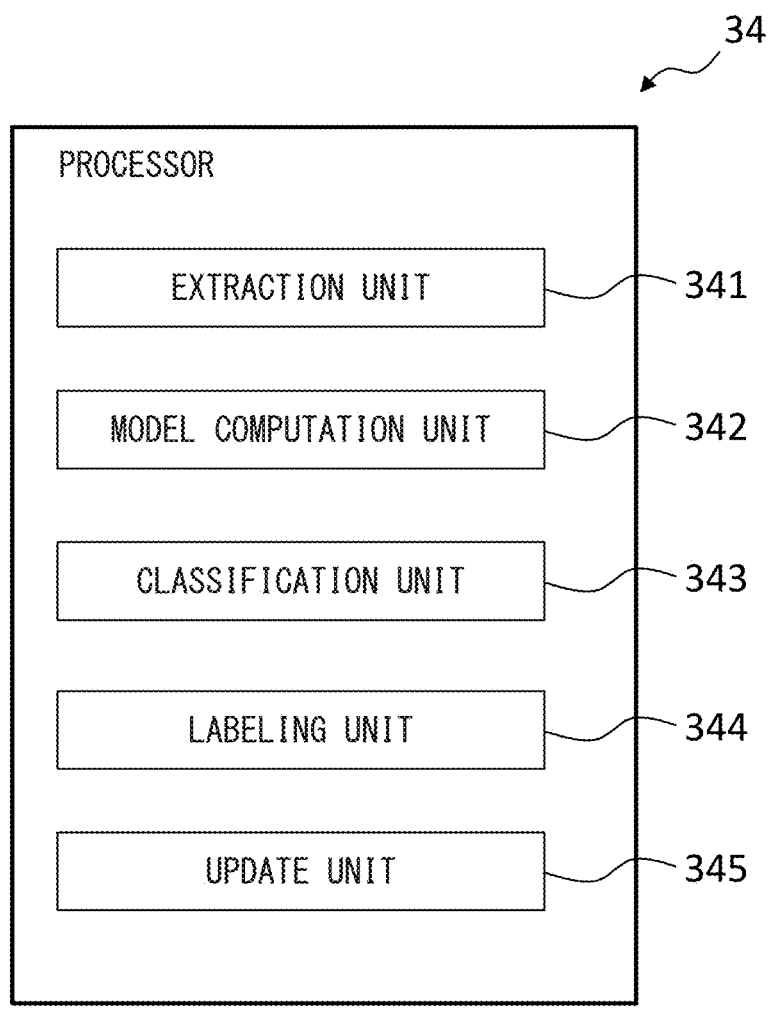
FIG. 4 is a functional block diagram of a processor included in the perceptual model update device.

FIG. 4 is a functional block diagram of the processor 34 included in the perceptual model update device 3.

As its functional blocks, the processor 34 of the perceptual model update device 3 includes an extraction unit 341, a model computation unit 342, a classification unit 343, a labeling unit 344, and an update unit 345. These units included in the processor 34 are functional modules implemented by a program executed by the processor 34. The computer program for achieving the functions of the units of the processor 34 may be provided in a form recorded on a computer-readable portable storage medium, such as a semiconductor memory, a magnetic medium, or an optical medium. Alternatively, the units included in the processor 34 may be implemented in the perceptual model update device 3 as separate integrated circuits, microprocessors, or firmware.

The extraction unit 341 extracts pieces of target data with a predetermined probability from pieces of data stored in the storage device 32, and may extract vicinity images selected randomly with a predetermined probability (e.g., 1%) from the vicinity images stored in the storage device 32, as target data. The extraction unit 341 may extract the piece of target data from pieces of data with a predetermined probability for each of classes into which the pieces of data are classified based on situations in which the respective pieces of data were obtained. For example, the extraction unit 341 may extract vicinity images selected randomly with a predetermined probability from vicinity images associated with a predetermined type of road shape among the vicinity images stored in the storage device 32, as target data corresponding to the predetermined type of road shape. The classes may be the times of day (e.g., daytime and nighttime) defined on the basis of illuminance included in environmental data, weather (e.g., rain and snow) defined on the basis of temperature and rainfall included in environmental data, or combinations of the above (e.g., a sharp curve on a rainy night and a divergent point of lanes on a snowy day).

The model computation unit 342 inputs each of pieces of target data and modified data obtained by making a predetermined modification to the piece of target data into a perceptual model to predict a label corresponding to the piece of target data and to calculate an uncertainty score and an inconsistency score corresponding to the piece of target data.

Figure 5:
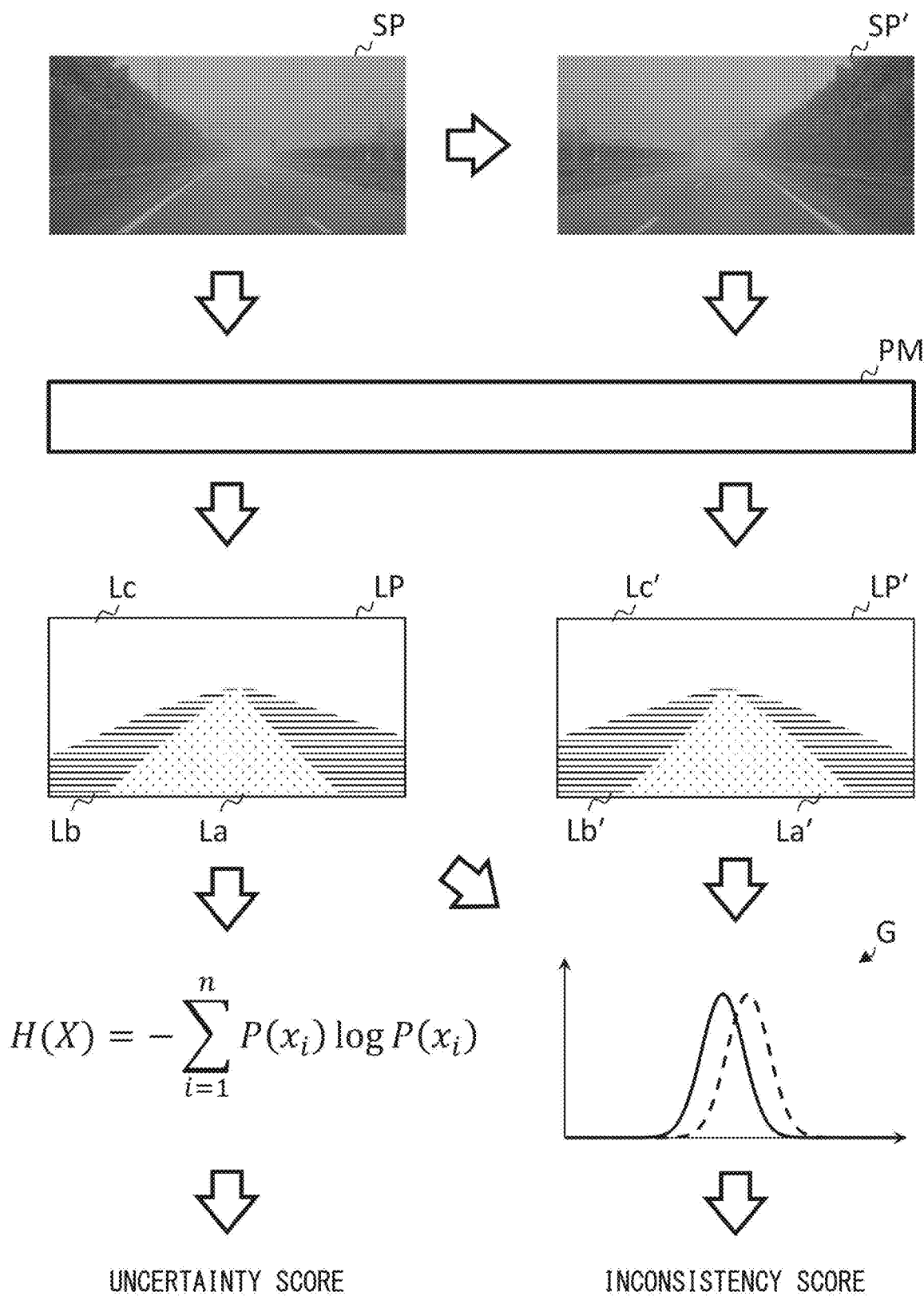
FIG. 5 illustrates an example of prediction of labels for target data and calculation of scores corresponding to the target data.

FIG. 5 illustrates an example of prediction of labels for target data and calculation of scores corresponding to the target data.

The model computation unit 342 inputs a vicinity image SP into a perceptual model PM to generate a label image LP in which a label is predicted for each of the pixels included in the vicinity image SP. In the label image LP, pixels predicted to correspond to a lane being traveled by the vehicle 2 in a road being traveled by the vehicle 2 have a label La. Pixels predicted to correspond to the region other than the lane being traveled by the vehicle 2 in the road being traveled by the vehicle 2 have a label Lb. Pixels predicted to correspond to the region other than the road being traveled by the vehicle 2 have a label Lc. Each of the pixels included in the label image LP is associated with an uncertainty level indicating how uncertain the prediction of the label of the pixel is.

The model computation unit 342 calculates an uncertainty score corresponding to the vicinity image SP, based on the uncertainty levels associated with the respective pixels included in the label image LP. The model computation unit 342 may calculate, for each pixel included in the label image LP, the product of an uncertainty level associated with the pixel and the logarithm of the uncertainty level, calculate the sum of the products, and determine the additive inverse of the sum (Shannon's entropy) as an uncertainty score corresponding to the vicinity image SP.

Further, the model computation unit 342 inputs a modified vicinity image SP' obtained by making a predetermined modification to the vicinity image SP into the perceptual model PM to generate a modified label image LP' in which for each of the pixels included in the modified vicinity image SP' is predicted a label corresponding to the pixel. The modified vicinity image SP' may be an image obtained by reversing the positions of the pixels in the vicinity image SP horizontally. In the modified label image LP', pixels predicted to correspond to the lane being traveled by the vehicle 2 in the road being traveled by the vehicle 2 have a label La'. Pixels predicted to correspond to the region other than the lane being traveled by the vehicle 2 in the road being traveled by the vehicle 2 have a label Lb'. Pixels predicted to correspond to the region other than the road being traveled by the vehicle 2 have a label Lc'.

The model computation unit 342 calculates an inconsistency score indicating the magnitude of the difference between the label predicted for the vicinity image SP and the label predicted for the modified vicinity image SP'. For example, the model computation unit 342 compares the distribution of uncertainty levels associated with the pixels included in the label image LP with the distribution of uncertainty levels associated with the pixels included in the modified label image LP'. A graph G represents the distribution of uncertainty levels associated with the pixels included in the label image LP and the distribution of uncertainty levels associated with the pixels included in the modified label image LP'. The abscissa and the ordinate of the graph G represent an uncertainty level and frequency, respectively. The model computation unit 342 calculates an inconsistency score so that the inconsistency score has a greater value as the difference between the distribution of uncertainty levels associated with the pixels included in the label image LP and the distribution of uncertainty levels associated with the pixels included in the modified label image LP' is greater.

Referring back to FIG. 4, the classification unit 343 classifies, out of the pieces of target data, a piece of target data whose uncertainty score is higher than the uncertainty threshold stored in the memory 33 and whose inconsistency score is higher than the inconsistency threshold stored in the memory 33 as first data. Out of the pieces of target data, the classification unit 343 classifies a piece of target data whose uncertainty score is lower than the uncertainty threshold and whose inconsistency score is higher than the inconsistency threshold as second data. Out of the pieces of target data, the classification unit 343 classifies a piece of target data whose uncertainty score is lower than the uncertainty threshold and whose inconsistency score is lower than the inconsistency threshold as third data.

The classification unit 343 may treat a piece of target data whose uncertainty score is equal to the uncertainty threshold as one whose uncertainty score is higher or lower than the uncertainty threshold. Similarly, the classification unit 343 may treat a piece of target data whose inconsistency score is equal to the inconsistency threshold as one whose inconsistency score is higher or lower than the inconsistency threshold.

Out of the pieces of target data, the classification unit 343 may classify a piece of target data whose uncertainty score is higher than the uncertainty threshold and whose inconsistency score is lower than the inconsistency threshold as any of first to third data or other data.

The labeling unit 344 gives an input label inputted via an input device to the first data as a label of the first data (manual labeling). For example, the labeling unit 344 generates labeling screen data for displaying a labeling screen to give a label to the first data, and transmits the generated data via the communication interface 31 to a display device (not illustrated) including a display that shows an image to a user. A user looking at the display on which the labeling screen is displayed operates an input device connected via the communication interface 31 to identify an input label to be given to the first data. The input label is stored in the memory 33 in response to the user's operation specifying a predetermined region in the labeling screen. The labeling unit 344 gives the input label as a label of the first data, and stores the label in the memory 33. The labeling unit 344 may transmit the labeling screen data via the communication interface 31 to an information processor other than the perceptual model update device 3.

Further, the labeling unit 344 gives a label to the second data by a labeling model configured to give a label to inputted data. The labeling model may be the perceptual model PM or a model other than the perceptual model PM (e.g., a model having a network configuration different from that of the perceptual model PM). The labeling unit 344 stores the second data given a label by the labeling model in the memory 33.

The update unit 345 updates the perceptual model PM by training the perceptual model PM with the first data given the label manually, the second data given the label by the labeling model, and the third data, and trains the perceptual model PM in accordance with a predetermined training technique, such as backpropagation, using the first data given the label manually, the second data given the label by the labeling model, and the third data as training data. The update unit 345 replaces the perceptual model PM before update with the updated perceptual model. For example, the update unit 345 transmits a parameter group for specifying the updated perceptual model to the vehicle 2 via the communication interface 31. Thereafter the ECU 25 of the vehicle 2 detects an object with the updated perceptual model.

Figure 6:
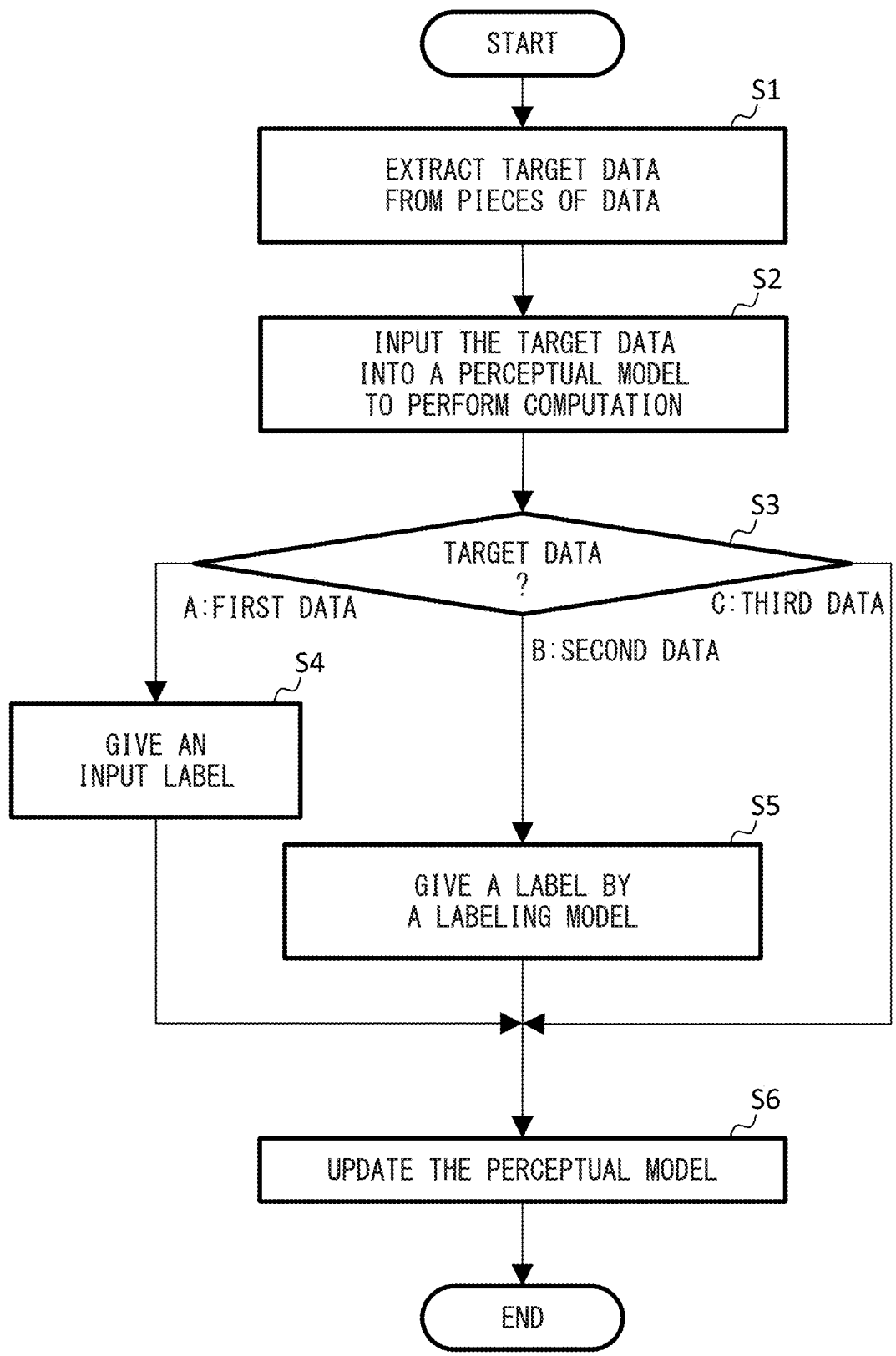
FIG. 6 is a flowchart of a perceptual model update process.

FIG. 6 is a flowchart of a perceptual model update process. The processor 34 of the perceptual model update device 3 executes the perceptual model update process illustrated in FIG. 6 in response to a user's predetermined operation, and may execute the perceptual model update process illustrated in FIG. 6 when a predetermined condition is satisfied, e.g., when a predetermined time has elapsed since the last execution or when the number of vicinity images stored in the storage device 32 reaches a predetermined number. The processor 34 may repeatedly execute the perceptual model update process illustrated in FIG. 6 multiple times at every start of the perceptual model update process.

First, the extraction unit 341 of the processor 34 extracts pieces of target data with a predetermined probability from pieces of data stored in the storage device 32 (step S1).

Next, the model computation unit 342 of the processor 34 inputs each of pieces of target data and modified data obtained by making a predetermined modification to the piece of target data into the perceptual model PM to predict a label corresponding to the piece of target data and to calculate an uncertainty score and an inconsistency score corresponding to the piece of target data (step S2).

The classification unit 343 of the processor 34 classifies, out of the pieces of target data, a piece of target data whose uncertainty score is higher than the uncertainty threshold stored in the memory 33 and whose inconsistency score is higher than the inconsistency threshold stored in the memory 33 as first data. Out of the pieces of target data, the classification unit 343 classifies a piece of target data whose uncertainty score is lower than the uncertainty threshold and whose inconsistency score is higher than the predetermined inconsistency threshold as second data. Out of the pieces of target data, the classification unit 343 classifies a piece of target data whose uncertainty score is lower than the uncertainty threshold and whose inconsistency score is lower than the predetermined inconsistency threshold as third data (step S3).

Regarding the first data (A in step S3), the labeling unit 344 of the processor 34 gives an input label inputted via an input device as a label of the first data (step S4) and goes to step S6 described below.

Regarding the second data (B in step S3), the labeling unit 344 gives a label by a labeling model (step S5) and goes to step S6 described below.

Regarding the third data (C in step S3), the classification unit 343 does not change the label given by the model computation unit 342 with the perceptual model PM, and goes to step S6 described below.

The update unit 345 of the processor 34 updates the perceptual model PM by training the perceptual model PM with the first data given the label manually, the second data given the label by the labeling model, and the third data (step S6), and terminates the perceptual model update process.

By executing the perceptual model update process in this way, the perceptual model update device 3 can update a perceptual model appropriately.

It should be noted that those skilled in the art can make various changes, substitutions, and modifications without departing from the spirit and scope of the present disclosure.

What is claimed is:

1. A perceptual model update device comprising a processor configured to:
    input each of pieces of target data and modified data obtained by making a predetermined modification to the piece of target data into a perceptual model to predict a label corresponding to the piece of target data and to calculate an uncertainty score corresponding to the piece of target data and an inconsistency score indicating the magnitude of the difference between the label predicted for the piece of target data and the label predicted for the modified data, the perceptual model being trained so as to predict a label corresponding to inputted data and to output an uncertainty score, the uncertainty score indicating how uncertain the prediction is;

classify, out of the pieces of target data, the piece of target data whose uncertainty score is higher than a predetermined uncertainty threshold and whose inconsistency score is higher than a predetermined inconsistency threshold as first data, classify the piece of target data whose uncertainty score is lower than the uncertainty threshold and whose inconsistency score is higher than the inconsistency threshold as second data, and classify the piece of target data whose uncertainty score is lower than the uncertainty threshold and whose inconsistency score is lower than the inconsistency threshold as third data;

give an input label inputted via an input device to the first data as a label of the first data, and give the label to the second data by a predetermined labeling model configured to give the label to inputted data; and update the perceptual model by training the perceptual model with the first data given the label, the second data given the label, and the third data.

2. The perceptual model update device according to claim 1, wherein the processor is further configured to extract the piece of target data from pieces of data with a predetermined probability for each of classes into which the pieces of data are classified based on situations in which the respective pieces of data were obtained.

3. The perceptual model update device according to claim 1, wherein each of the pieces of target data is image data including pixels, and the perceptual model is trained so as to predict the label for each of the pixels included in the image data.

4. The perceptual model update device according to claim 3, wherein to predict the label, the processor uses data obtained by reversing the positions of the pixels in the image data horizontally as the modified data.

5. A method for updating a perceptual model executed by a perceptual model update device that updates a perceptual model trained so as to predict a label corresponding to inputted data and to output an uncertainty score indicating how uncertain the prediction is, the method comprising:

inputting each of pieces of target data and modified data obtained by making a predetermined modification to the piece of target data into the perceptual model to predict the label corresponding to the piece of target data and to calculate the uncertainty score corresponding to the piece of target data and an inconsistency score indicating the magnitude of the difference between the label predicted for the piece of target data and the label predicted for the modified data;

classifying, out of the pieces of target data, the piece of target data whose uncertainty score is higher than a predetermined uncertainty threshold and whose inconsistency score is higher than a predetermined inconsistency threshold as first data, classifying the piece of target data whose uncertainty score is lower than the uncertainty threshold and whose inconsistency score is higher than the inconsistency threshold as second data, and classifying the piece of target data whose uncertainty score is lower than the uncertainty threshold and whose inconsistency score is lower than the inconsistency threshold as third data;

giving an input label inputted via an input device to the first data as a label of the first data, and giving the label to the second data by a predetermined labeling model configured to give the label to inputted data; and updating the perceptual model by training the perceptual model with the first data given the label manually, the second data given the label by the labeling model, and the third data.

6. A non-transitory computer-readable medium storing a computer program for updating a perceptual model, the computer program causing a computer to execute a process comprising:

inputting each of pieces of target data and modified data obtained by making a predetermined modification to the piece of target data into a perceptual model to predict a label corresponding to the piece of target data and to calculate an uncertainty score corresponding to the piece of target data and an inconsistency score indicating the magnitude of the difference between the label predicted for the piece of target data and the label predicted for the modified data, the perceptual model being trained so as to predict a label corresponding to inputted data and to output an uncertainty score, the uncertainty score indicating how uncertain the prediction is;

classifying, out of the pieces of target data, the piece of target data whose uncertainty score is higher than a predetermined uncertainty threshold and whose inconsistency score is higher than a predetermined inconsistency threshold as first data, classifying the piece of target data whose uncertainty score is lower than the uncertainty threshold and whose inconsistency score is higher than the inconsistency threshold as second data, and classifying the piece of target data whose uncertainty score is lower than the uncertainty threshold and whose inconsistency score is lower than the inconsistency threshold as third data;

giving an input label inputted via an input device to the first data as a label of the first data, and giving the label to the second data by a predetermined labeling model configured to give the label to inputted data; and updating the perceptual model by training the perceptual model with the first data given the label manually, the second data given the label by the labeling model, and the third data.

* * * * *